Figure 1:
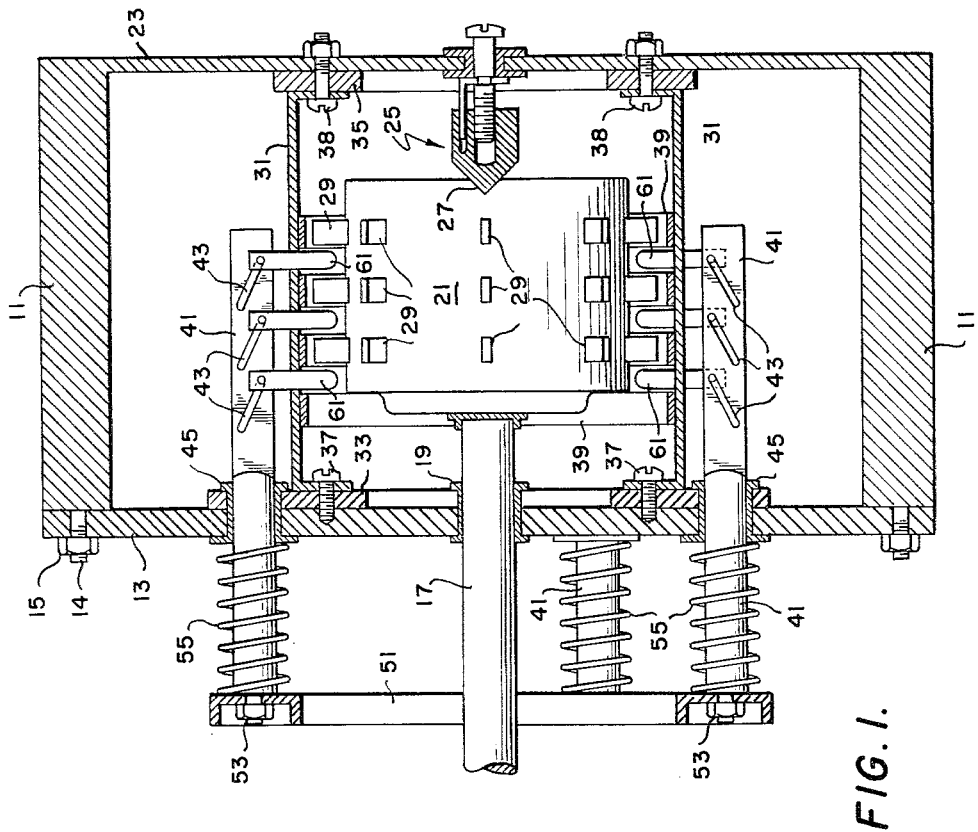

Jan. 11, 1966 K. W. HOLLANDER 3,228,500

VARIABLE FLUID SHEAR CLUTCH

Filed April 29, 1964

INVENTOR.
K. W. HOLLANDER
BY

United States Patent Office 3,228,500
Patented Jan. 11, 1966

3,228,500
VARIABLE FLUID SHEAR CLUTCH
Kurt W. Hollander, 840 Monroe St., Apt. T-6,
Annapolis, Md.
Filed Apr. 29, 1964, Ser. No. 363,375
9 Claims. (Cl. 192—58)

The present invention relates to a variable torque device, and more particularly, relates to a device which hydraulically transfers power from input shaft to an output shaft which is given a torque mechanically variable over a predetermined range.

Briefly stated, according to one version of the present invention there is employed a rotating input shaft terminating in a drum having a plurality of fixed, spoon-shaped vanes radially extending therefrom in circular rows. The drum portion of the input shaft is located in a sealed hydraulic chamber containing viscous fluid. A hollow output shaft is located in the chamber and surrounds the input shaft drum in spaced relation thereto. The output shaft rotates by virtue of a plurality of inwardly extending, radial, spoon-shaped vanes mounted thereon which may pass in the intervals between the rows of vanes on the input drum thereby coupling the output shaft with the input shaft due to the viscous flow. The output shaft vanes present an effective area to the viscous fluid which can be adjusted over a predetermined range. This adjustment of the output shaft vanes may be accomplished by mechanical means for retracting and extending the vanes so that more or less effective area, including zero area, may be presented to the viscous fluid. Because the output shaft vanes may be retracted entirely from positions where they would coact with the viscous flow set up by the input shaft vanes, complete slippage and, therefore, negligible power transfer is obtained. With the output shaft vanes extended, there are negligible transfer losses.

The difficulty in prior art devices is that they are incapable of providing, regardless of load, both negligible losses under maximum input-to-output coupling and virtually complete slippage under minimum input-to-output coupling conditions.

It is, therefore, among the objects of the present invention to provide improved power transfer apparatus wherein coupling variation provides an operating range from maximum slippage to maximum torque transfer; to provide improved mechanical torque varying means for hydraulic power transfer means, and to provide highly economical, efficient, compact, and sensitive mechanical torque varying means for hydraulic transmission systems adaptable for use with both large and small power plants and control systems in general. For example, the present invention may be used as an analog-to-digital or digital-to-analog converter.

Figure 2:
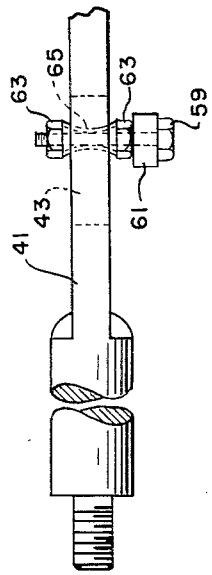
Figure 3:
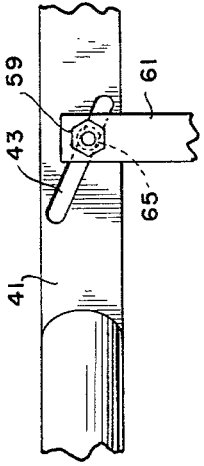

Reference is now made to the following detailed specification and accompanying drawings, wherein like reference numerals denote like parts and in which:

FIG. 1 is a view in modified longitudinal cross section of power transfer apparatus according to the invention; and FIGS. 2 and 3 are respective views of details of FIG. 1 blown up for explanatory purposes.

Referring to FIG. 1, there is provided a rotatable liquid-filled casing 11 having an end plate 13 with bolts 14 which are secured thereto by self-locking nuts 15. An input shaft 17 enters the end plate 13 thru a sealed bushing 19, and terminates in an input drum portion 21 of expanded diameter. The other end of the rotatable casing 11 has an integral or bolted-on end plate 23 thru the center of which is passed an axially adjustable screw-type, pointed bearing mount 25 of any suitable design. A recess 27 in one end of the drum 21 receives the pointed end of the bearing mount 25 so that the input shaft 17 rotates in alignment with, but independently of, the casing 11.

The input drum 21 has a plurality of fixed, spoon shaped vanes 29 mounted thereon in spaced-apart rows. When the casing 11 is filled with a suitable liquid, the rotation of the drum 21 causes the vanes 29 to set the liquid in motion.

Power is transmitted to the casing 11 by means of variable torque means which employ a cylindrical frame composed of a plurality of axial strips or bars 31 of stiff construction mounted at their ends on a pair of axially spaced mounting rings 33 and 35. The mounting ring 33 is secured by means of bolts 37 to the interior side of the end plate 13. The other mounting ring 35 may also be rigidly connected to the casing 11 by means of bolts 38. The axial strips 31 are banded by a plurality of axially spaced toroidal strips 39 which provide a firm, generally cylindrical structure radially surrounding the input drum 21 in spaced relation thereto.

For each of the axial strips or rods 31 there is provided an axially movable guide strip 41 each having a plurality of axially spaced, parallel canted slots 43. Each of the guide strips 41 passes thru the end plate 13 via a seal 45 of any suitable construction. The exterior ends of each of the guide strips 41 may be in the form of rods of circular cross section, and the extremity of each rod portion is secured to a torque adjusting ring 51 in any suitable manner, for example, as by countersunk bolts 53.

The exterior end of each of the guide strips 41 carries a compression spring 55 which exerts a force against the torque adjusting ring 51 to push the torque adjusting ring in a direction away from the end plate 13. A control lever (not shown) may be employed in an obvious, well-known manner for axially positioning the torque adjusting ring 51 against the bias of the spring 55. For example, a simple rod or lever having a pinned ball bearing may be positioned for pushing the torque adjusting ring inwardly.

As best seen in FIGS. 2 and 3, each of the canted slots 43 located in the guide strips 41 carries a bolt 59 extending thru the flat upper end of a spoon shaped output vane 61. The bolt 59 may be of any suitable construction to move freely back and forth in the canted slot. As exemplarily illustrated, each of the bolts 59 has a pair of spaced lock nuts 63 in between which is mounted a concavely rounded rivet 65 for sliding along the edge of the slot 43 which acts as a cam or track therefor.

The output vanes 61 are caused to retract or extend in radial directions by means of the bolts 59 being lifted radially inward and outward when the guide strips 41 are moved in axial directions. The vanes 61 are restrained from movement in axial directions by means of slots formed by spaces between the intersecting toroidal strip 39 and the axial strips 31. Alternatively a hollow cylinder may be substituted for the frame formed of the axial strips 31 and the toroidal strips 39 with axial slots provided therein thru which the output vanes 61 may pass.

In operation, when the output shaft vanes 61 are fully extended, the vanes 61 pass between the rows of shaft vanes 29 in close proximity to the surface of the drum 21. Maximum coupling or power transfer between the input and output shafts is accomplished in this position, in which the torque adjusting ring 51 is fully extended under the bias of the springs 55. Of course, the viscous flow set up by the input vanes 29 causes the output vanes 61 to rotate the casing 11 and shaft 12 via the structure including axial strips 31, toroidal bands 39 and guide strips 41—all of which are fastened to the retaining rings 33 and 35.

When the torque adjusting ring 51 is moved toward the end plate 13, the action of the canted slots 43 on the bolts 59 causes retraction of the output shaft vanes 61, thereby decreasing the power transfer between the input and output shafts. When the output shaft vanes 61 are fully retracted so that their extremities are fully withdrawn from the interior space defined by the axial and toroidal strips 31 and 39, there is a minimum of power transfer between the input and output shafts. In this condition the viscous flow set up by rotation of the input drum 21 does not appreciably affect the output shaft because there are no exposed output vane elements on which the viscous flow may act. Consequently, virtually complete slippage is obtained when the output shaft vanes 61 are fully retracted.

It is understood that the roles of the casing 11 and shaft 17 may be reversed, i.e., the shaft 17 may be provided with movable vanes according to the teachings herein so that the movable vanes on shaft 17 cooperate with fixed vanes on casing 11. Of course, in the arrangement as shown in FIG. 1 the casing 11 may operate as the input shaft and the shaft 17, as the output shaft.

Obviously many modifications and variations of the present invention are possible in the light of the above teachings. It is therefore to be understood that within the scope of the appended claims the invention may be practiced otherwise than as specifically described.

What is claimed is:

1. A variable torque transfer apparatus for varying the torque between a driven input element and an output element, comprising:
    a chamber filled with viscous fluid;
    coaxial input and output elements, each extending into said chamber and each having a plurality of vanes mounted thereon for coaction with the viscous fluid; and
    means comprising a plurality of axially movable members;
    each of said members having a guiding means;
    following means located on each vane of said plurality of vanes; and
    a cylindrical frame means mounted in said chamber restraining said vanes to essentially radial movement under the influence of the axial movement of said members, whereby the effective area of said vanes operating on said fluid is varied from zero to a predetermined maximum.

2. Variable torque apparatus according to claim 1 wherein said guiding means is a slot, one slot for each vane of said plurality, and wherein said following means comprises a rod-like element extending thru said slot.

3. Variable torque transfer apparatus for varying the torque between a driven input shaft and an output shaft coaxial therewith, comprising:
    a casing fixed to the output shaft for rotation therewith;
    a pool of liquid substantially entirely filling said casing;
    said casing sealably surrounding one end of the input shaft in spaced relation thereto;
    a plurality of vanes radially extending from the casing-enclosed portion of the input shaft and arranged in axially spaced circular rows thereon;
    a frame element located within and rigidly attached to said casing, and surrounding the sealed portion of said input shaft in spaced relation thereto;
    a plurality of essentially radially retractable and extensible output vanes mounted on said frame and oriented radially in relation to the input shaft; and
    said output vanes being arranged whereby when fully extended, said vanes pass between the circular rows said input vanes for providing maximum power transfer, and when fully retracted, said output vanes being completely withdrawn from the annular space between said input vanes and said frame element;
    essentially axially movable means connected to said output vanes and fluid tightly extending thru said casing for controlling the radial movement of said output vanes.

4. Variable torque transfer apparatus according to claim 3 wherein said axially movable means comprises:
    a plurality of rod-like members;
    each of said rod-like members extending thru the casing whereby when the casing rotates, each of said members revolves about the central axis of the casing;
    each of said rod-like members having guiding means located thereon;
    follower means located on each of said retractable and extensible output vanes and engaging said guiding means; and
    means restraining axial movement of said output vanes whereby upon axial movement of said rod-like members, said output vanes move in directions essentially perpendicular to the axis of said casing.

5. Variable torque transfer apparatus according to claim 4 wherein said guiding means comprises a plurality of parallel elements canted to the axis of the casing.

6. Variable torque transfer apparatus according to claim 5 wherein each of said guiding means comprises a slot, and wherein each of said follower means comprises an elongated body connected to each output vane and passing thru said slot.

7. Improved mechanical apparatus for varying torque transfer between coaxial input and output elements comprising input and output elements mounted for rotation in a confined volume of viscous fluid, the input and output elements each having mounted thereon a plurality of essentially discrete radial vanes, one of said plurality of vanes being movable and said plurality of vanes being so arranged with respect to one another in axially spaced rows on said input and output elements so as to allow said movable vanes to be brought into radial juxtaposition to the other of said plurality of vanes:
    essentially axially movable means extending into the volume of confined viscous fluid;
    guiding means located on said axially movable means;
    follower means connected to the plurality of movable vanes and engaging said axially movable means; and
    means for restraining axial movement of the movable vanes;
    whereby upon movement of said guiding means said movable vanes are extensible to positions in the viscous flow of maximum torque transfer and are retractable to positions entirely withdrawn from the viscous flow to establish zero torque transfer between the input and output shafts.

8. The apparatus according to claim 7 wherein said guiding means comprises a plurality of radially canted slots, one slot for each movable vane, and wherein follower means comprises an element for each vane freely movable in said slot.

9. Apparatus according to claim 7 wherein said axially movable means comprises a plurality of strips passing beyond the confined volume of said viscous fluid;

each strip having an axial location corresponding to an axial disposition of movable vanes, and wherein said guiding means comprises a plurality of discrete radially canted parallel slots located in each of said strips, one slot for each movable vane; and wherein said follower means comprises an elongated body mounted on each movable vane and passing thru said slot for free movement therein.

References Cited by the Examiner

UNITED STATES PATENTS

| 1,234,776 | 7/1917 | Lake | 192—58 |
| 1,655,743 | 4/1928 | Knapp | 192—58 |
| 1,921,048 | 8/1933 | Thomas | 192—58 |
| 1,940,918 | 12/1933 | Petroni et al. | 192—58 |
| 2,002,629 | 5/1935 | Cobb et al. | 192—58 |
| 2,400,186 | 5/1946 | Armentrout | 192—58 |

DAVID J. WILLIAMOWSKY, *Primary Examiner.*